Sept. 9, 1958   H. L. HALVORSON   2,850,830
SELF-HOOK SETTER
Filed Nov. 3, 1955
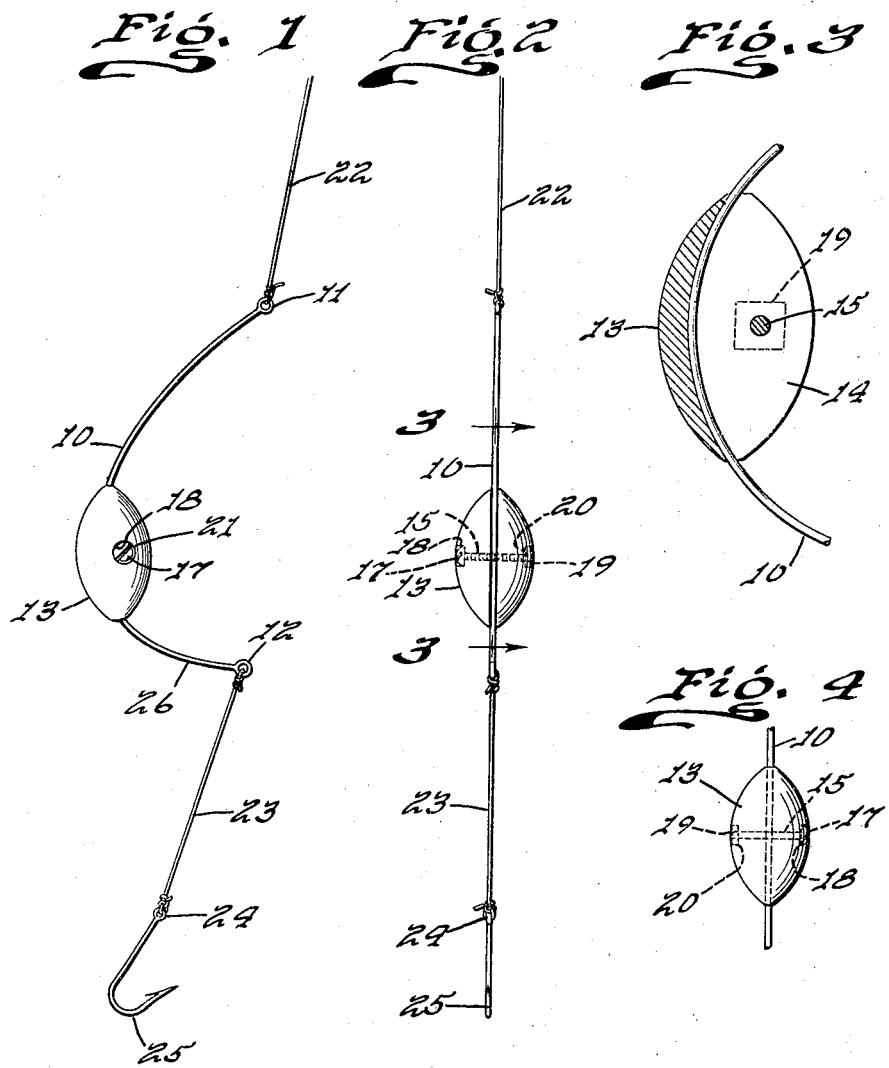
INVENTOR.
Harlan L. Halvorson
BY Victor J. Evans & Co.

United States Patent Office 2,850,830
Patented Sept. 9, 1958

2,850,830

SELF-HOOK SETTER

Harlan L. Halvorson, Wells, Minn., assignor of one-half to John R. Kensok, Minnesota Lake, Minn.

Application November 3, 1955, Serial No. 544,757

3 Claims. (Cl. 43—15)

This invention relates to fishing tackle, and in particular, a hook and sinker combination wherein a sinker is mounted on the intermediate part of a C-shaped spring wire with one end of the spring wire attached to a fishing line and with a hook attached by a leader to the opposite end wherein a fish striking a bait on the hook spreads the C-shaped member and spring inherent in said member retracts the hook setting the hook in the mouth of the fish.

The purpose of this invention is to provide means for applying a jerk to the hook of a fishing line the instant a fish takes bait on the hook so that the hook is set by means positioned close to the hook and the necessity of transmitting a quick pull or jerk through a long length of fishing line is obviated.

Numerous fish are lost because a fish strikes and takes bait from a hook without reaction through the fishing line primarily because a fishing line is comparatively long, however, in some instances where a fisherman is watching several lines, a fish may escape from one line while another fish is being taken from one of the other lines. With this thought in mind, this invention contemplates a loop of spring material positioned in a fishing line adjacent a hook with a weight on the intermediate part of the loop wherein the weight or sinker functions as anchoring means with the end of the loop at one side of the weight acting against a fishing line and with the end at the opposite side of the weight controlling the movement of a hook suspended therefrom.

The object of this invention is, therefore, to provide means in a fishing line for applying a quick jerk to a hook the instant a fish strikes without the jerk or pulling action being transmitted through a long length of fishing line.

Another object of the invention is to provide means for forming a spring reacting element whereby the device is adapted to be installed in a fishing line, relatively close to a hook, so that spring inherent therein retracts a hook the instant a fish attempts to take bait therefrom.

A further object of the invention is to provide a mounting element for a hook of a fishing line which supplies a quick pull or jerk the instant a fish takes bait from a hook of the line in which the device is of a simple and economical construction.

With these and other objects and advantages in view, the invention embodies a substantially C-shaped spring wire loop having eyes on the ends and a weight adjustably mounted on the intermediate part wherein with one end attached to a fishing line and with a hook attached by a leader to the opposite end the device is adapted to spread as a fish takes a bait on the hook with the result that the reaction resulting from spring inherent in said member snaps the hook back, setting a fish thereon.

Other features and advantages of the invention will appear from the following description, taken in connection with the drawing, wherein:

Figure 1 is a side elevational view showing the lower portion of a fishing line with the improved hook setting spring loop incorporated in the line.

Figure 2 is a front elevational view of the fishing line with the parts as shown in Figure 1.

Figure 3 is a vertical section through the sinker of the fishing line taken on line 3—3 of Figure 2 with the parts shown on an enlarged scale and illustrating the method of clamping the sinker to a spring wire loop.

Figure 4 is an elevational view looking toward the outer surface of the sinker showing the sinker on the spring wire loop and with the ends of the loop broken away.

Referring now to the drawing, wherein like reference characters denote corresponding parts, the improved self-setting hook mounting of this invention includes a spring wire loop 10 having eyes 11 and 12 on the ends, a weight or sinker 13 having a slot 14 extended inwardly from one side, and a bolt 15 having a head 17 positioned in a countersunk opening 18 in one side of the sinker and a nut 19 threaded on the end of the bolt opposite to that on which the head is positioned and adapted to be retained in a countersunk opening 20, similar to the opening 18.

With the opening 20, substantially of the same shape as that of the nut 19, the bolt may readily be secured in the sinker and removed therefrom with a screwdriver, the bit of which may be placed in a slot 21 in the head 17. By this means the position of the weight or sinker on the loop 10 is readily adjustable.

The eye 11 at the upper end of the loop is connected to a fishing line 22 and a leader 23 is attached to the eye 12 at the opposite end. The opposite end of the leader 23 is attached to an eye 24 of a hook, as indicated by the numeral 25, and it will be understood that the leader 23 may be of any suitable length.

With the parts designed and assembled as shown and described, the sinker 13 functions as an anchor permitting upper and lower sections of the loop 10 to open and contract and by this means the hook 25 is suspended from the lower short spring arm of the loop. The loop is suspended through the upper portion thereof from the lower end of a fishing line, as indicated by the numeral 22.

A fish striking bait on the hook 25 draws a lower section of the loop, which is indicated by the numeral 26, downwardly and the instant the pull is released spring inherent in the loop draws the arm and hook upwardly with a snap action definitely setting the hook in the mouth of the fish. By this means it is not necessary to exert a quick pull on a fishing rod remotely situated from the hook wherein it is necessary to transmit the pull or jerk through a long length of fishing line permitting the fish to escape before the pull reaches the hook.

The position of the weight or sinker 13 is adapted to be adjusted to regulate the snap action of the lower portion of the spring loop.

It will be understood that modifications, within the scope of the appended claims, may be made in the design and arrangement of the parts without departing from the spirit of the invention.

What is claimed is:

1. In a fish hook mounting, the combination which comprises a C-shaped spring wire loop having eyes on the ends, a sinker having a longitudinally disposed slot therethrough positioned on the loop with the spring wire positioned in the slot, fastening means extended through the sinker for clamping the sinker on the spring wire loop and a fish hook attached by a leader to the eye at one end of the loop, the eye at the opposite end of the loop being adapted to be connected to a fishing line, and the eye to which the fish hook is attached being in alignment with a fishing line extended from the eye at the opposite end of the loop.

2. In a snap action for a fishing line, the combination which comprises a C-shaped spring wire loop, a weight having a longitudinally disposed slot therein positioned on the loop with the spring wire extended into the slot, a bolt extended through the weight for clamping the weight on the loop, means for attaching a fishing line to one end of the loop, and means for attaching a hook to the opposite end of the loop, the said hook attaching means being positioned in alignment with the line attaching means at the opposite end of the loop.

3. In a fish hook mounting, the combination which comprises a C-shaped spring wire loop, a weight on the loop and spaced a greater distance from the upper end of the loop than from the lower end, the radius of the portion of the loop extended from the weight to the upper end being greater than the radius of the portion of the loop extended from the weight to the lower end thereof, a fishing line attached to and extended from the upper end of the loop, and a leader with a fish hook thereon extended from the lower end, the lower end of the loop being in alignment with the fishing line extended from the upper end thereof, with the device in use.

References Cited in the file of this patent

UNITED STATES PATENTS

| | | |
|---|---|---|
| 1,123,636 | Wiesenfeld | Jan. 5, 1915 |
| 1,916,937 | Schlaburg | July 4, 1933 |
| 2,157,819 | Eckert | May 9, 1939 |
| 2,526,980 | Turchan | Oct. 24, 1950 |
| 2,759,290 | Strausser | Aug. 23, 1956 |